United States Patent
Val

(10) Patent No.: US 10,990,068 B2
(45) Date of Patent: Apr. 27, 2021

(54) TECHNOLOGIES FOR PROVIDING CLOUD-BASED MANAGEMENT OF AN ELECTRICAL GRID

(71) Applicant: ABB Schweiz AG, Baden (CH)

(72) Inventor: Cristian Val, Buenos Aires (AR)

(73) Assignee: ABB Schweiz AG, Baden (CH)

( * ) Notice: Subject to any disclaimer, the term of this patent is extended or adjusted under 35 U.S.C. 154(b) by 435 days.

(21) Appl. No.: 15/991,230

(22) Filed: May 29, 2018

(65) Prior Publication Data

US 2019/0369574 A1 Dec. 5, 2019

(51) Int. Cl.
*G05B 15/02* (2006.01)
*H04L 29/06* (2006.01)
*G06F 9/455* (2018.01)
*H04L 29/08* (2006.01)
*G06Q 50/06* (2012.01)

(52) U.S. Cl.
CPC ......... *G05B 15/02* (2013.01); *G06F 9/45558* (2013.01); *G06Q 50/06* (2013.01); *H04L 63/0272* (2013.01); *H04L 63/0428* (2013.01); *H04L 67/10* (2013.01); *G06F 2009/45595* (2013.01); *H04L 63/20* (2013.01)

(58) Field of Classification Search
CPC ................ G05B 15/02; G06F 9/45558; G06F 2009/45595; G06Q 50/06; H04L 63/0272; H04L 63/0428; H04L 67/10; H04L 29/06; H04L 29/08; H04L 63/20
See application file for complete search history.

(56) References Cited

U.S. PATENT DOCUMENTS

| 2012/0310860 | A1* | 12/2012 | Kim ...................... G06Q 30/08 705/412 |
| 2013/0325199 | A1* | 12/2013 | Coe ......................... G01W 1/10 700/291 |
| 2013/0345884 | A1 | 12/2013 | Forbes, Jr. |
| 2015/0082385 | A1 | 3/2015 | Maria |
| 2016/0172859 | A1* | 6/2016 | Marhoefer .............. H02J 3/383 700/295 |
| 2016/0329710 | A1* | 11/2016 | Clifton .................... H02J 3/381 |
| 2017/0017251 | A1 | 1/2017 | Forbes, Jr. |
| 2017/0077751 | A1 | 3/2017 | Forbes, Jr. |

(Continued)

FOREIGN PATENT DOCUMENTS

| CA | 2880044 A1 | 2/2014 |
| CN | 103269381 A | 8/2013 |

(Continued)

*Primary Examiner* — Ronald D Hartman, Jr.
(74) *Attorney, Agent, or Firm* — Barnes & Thornburg LLP

(57) ABSTRACT

Technologies for providing cloud-based management of an electrical grid include a method. The method includes determining, by a compute device of a cloud data center, one or more cloud-based electrical grid management services to provide for a client of the cloud data center. The method also includes executing, by the compute device, each determined service in a virtual machine hosted by the compute device, receiving, by the compute device, data from one or more field devices in the electrical grid through an encrypted virtual private network, and analyzing, by the compute device and with the one or more determined services executed in the virtual machine, the received data to determine a responsive action.

33 Claims, 6 Drawing Sheets

(56) References Cited

U.S. PATENT DOCUMENTS

| | | | |
|---|---|---|---|
| 2017/0163058 A1* | 6/2017 | Baumgartner | H02J 7/0027 |
| 2017/0223807 A1* | 8/2017 | Recker | H02J 13/00017 |
| 2017/0243290 A1* | 8/2017 | Brown | G06Q 30/0202 |
| 2018/0054062 A1* | 2/2018 | Roessler | H02J 3/00 |
| 2018/0316187 A1* | 11/2018 | Shim | H02J 3/28 |
| 2018/0316222 A1* | 11/2018 | Shim | H02J 13/00034 |
| 2019/0288516 A1* | 9/2019 | Peloso | H02J 15/00 |
| 2019/0380091 A1* | 12/2019 | Li | H02J 13/00028 |
| 2020/0036225 A1* | 1/2020 | Kolling | G06Q 50/06 |

FOREIGN PATENT DOCUMENTS

| | | |
|---|---|---|
| CN | 104460609 A | 3/2015 |
| CN | 1052825332 A | 8/2016 |
| KR | 20160053229 A | 5/2016 |
| WO | 2015/160779 A1 | 10/2015 |
| WO | 2015/195861 A1 | 12/2015 |

* cited by examiner

TECHNOLOGIES FOR PROVIDING CLOUD-BASED MANAGEMENT OF AN ELECTRICAL GRID

BACKGROUND

Operators of utilities (e.g., for electrical power distribution) or other systems that include a relatively large amount of field devices (e.g., devices located remote from a central control center that may report information to the central control center and may be remotely controllable by the central control center) typically invest a considerable amount of funds into the control software used to control the operation of the field devices. The functionality of the control software is often fixed, once it has been established, and as the computer hardware to execute the software is typically located in one particular geographic location, the ability to communicate with field devices that are further away is diminished as the latency for messages between the control center and the field devices increases with the distance of the field devices from the control center. As such, utilities may be limited in their ability to provide service to new markets (e.g., new geographic regions that are further away from the control center) and may be unable to quickly provide additional functionality to customers, given the relatively static nature of the software in the control center.

SUMMARY OF THE INVENTION

In one aspect, the present disclosure provides a method for providing cloud-based management of an electrical grid. The method includes determining, by a compute device of a cloud data center, one or more cloud-based electrical grid management services to provide for a client of the cloud data center. The method also includes executing, by the compute device, each determined service in a virtual machine hosted by the compute device, receiving, by the compute device, data from one or more field devices in the electrical grid through an encrypted virtual private network, and analyzing, by the compute device and with the one or more determined services executed in the virtual machine, the received data to determine a responsive action.

In another aspect, the present disclosure provides a compute device of a cloud data center to provide cloud-based management of an electrical grid. The compute device includes a compute engine to determine one or more cloud-based electrical grid management services to provide for a client of the cloud data center. The compute engine is also to execute each determined service in a virtual machine hosted by the compute device, receive data from one or more field devices in the electrical grid through an encrypted virtual private network, and analyze, with the one or more determined services executed in the virtual machine, the received data to determine a responsive action.

In yet another aspect, the present disclosure provides one or more machine-readable storage media including a plurality of instructions stored thereon that, in response to being executed, cause a compute device to determine one or more cloud-based electrical grid management services to provide for a client of the cloud data center, execute each determined service in a virtual machine hosted by the compute device, receive data from one or more field devices in the electrical grid through an encrypted virtual private network, and analyze, with the one or more determined services executed in the virtual machine, the received data to determine a responsive action.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
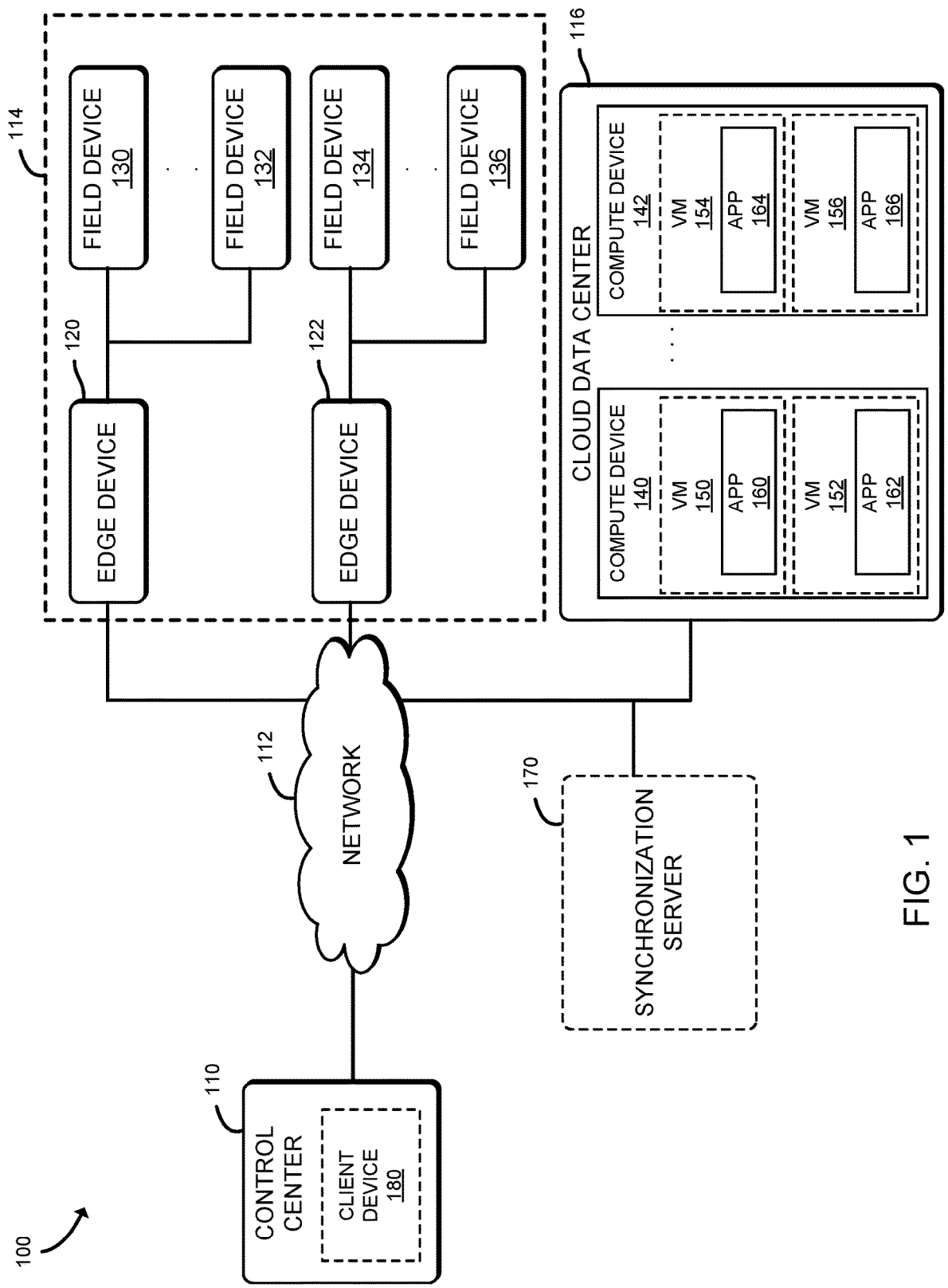
FIG. 1 is a simplified block diagram of at least one embodiment of a system for providing cloud-based management of an electrical grid.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing cloud-based management of an electrical grid includes a control center 110, including one or more client devices 180, in communication with a cloud data center 116. The cloud data center 116 includes a set of compute devices 140, 142 that, in operation, execute one or more services (e.g., applications 160, 162, 164, 166) on behalf of one or more customers (e.g., operators of the control center 110 and other control centers (not shown) of other utilities). In the illustrative embodiment, the compute devices 140, 142 execute the applications 160, 162, 164, 166 in virtualized environments (e.g., in virtual machines 150, 152, 154, 156) and isolate the operations and data of one client from the operations and data of another client, such as with encrypted communications (e.g., through an encrypted virtual private network). The cloud data center 116 is in communication with a set of edge devices 120, 122 and field devices 130, 132, 134, 136 (e.g., through the corresponding edge devices 120, 122) in an electrical grid 114. Each edge device 120, 122 may be embodied as any device capable of providing an entry point into an enterprise or service provider core network (e.g., routers, routing switches, integrated access devices (IADs), multiplexers, etc.). The field devices 130, 132, 134, 136 may include disconnectors, reclosers, medium voltage switchgears and/or other remotely controllable devices that facilitate the distribution of electricity through the electrical grid 114. In the illustrative embodiment, the edge devices 120, 122 are in communication with the corresponding field devices 130, 132, 134, 136 through a cellular network (e.g., a Long Term Evolution (LTE) network). Additionally, in the illustrative embodiment, the system 100 includes a synchronization server 170, which may be embodied as any computer device configured to synchronize the operations of the field devices 130, 132, 134, 136, such as by sending time information to the field devices 130, 132, 134, 136 using a corresponding protocol (e.g., simple network time protocol (SNTP)).

In operation, the compute devices 140, 142 of the cloud data center 116 enable a client (e.g., a utility operating the control center 110) to use software-based services (e.g., load prediction services, fault prediction services, automated control services, diagnostic services, etc.) on a dynamic, as-requested basis, rather than spending significant funds to build its own data center to host the software to provide the services. Further, while one cloud data center 116 is shown at a particular location relative to the electrical grid 114, it should be understood that the cloud data center 116 may be located elsewhere and/or distributed across multiple locations (e.g., in locations that are relatively close to an electrical grid 114 of the utility, anywhere in the world). Further, while the system 100 is described herein as operating in connection with an electrical grid 114, it should be understood that the system 100 may likewise operate in connection with a network of field devices other contexts as well (e.g., an industrial plant, a mining site, etc.).

Figure 2:
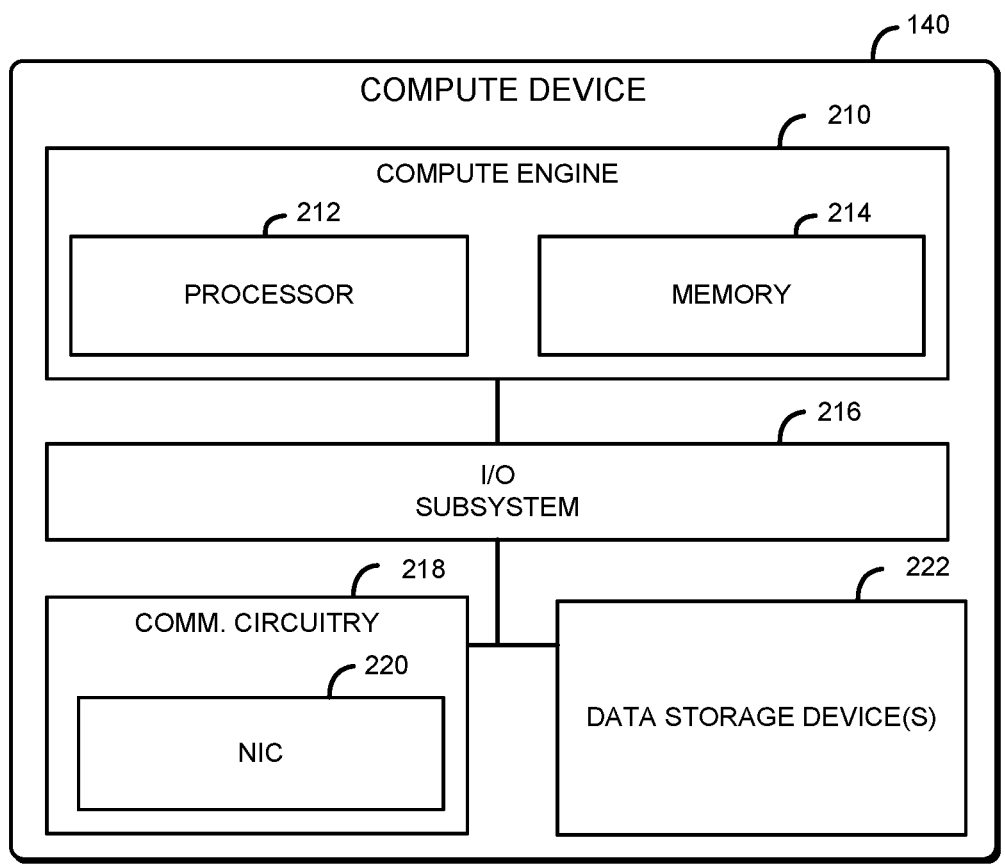
FIG. 2 is a simplified block diagram of at least one embodiment of a compute device of the system of FIG. 1.

Referring now to FIG. 2, the compute device 140 may be embodied as any type of device (e.g., a computer) capable of performing the functions described herein, including determining one or more cloud-based electrical grid management services to provide for a client of the cloud data center 116, executing each determined service in a virtual machine 150, 152 hosted by the compute device 140, receiving data from one or more field devices 130, 132, 134, 136 in the electrical grid 114 through an encrypted virtual private network, analyzing, with the one or more determined services executed in the virtual machine 150, 152, the received data to determine a responsive action, and performing the responsive action.

As shown in FIG. 2, the illustrative compute device 140 includes a compute engine 210, an input/output (I/O) subsystem 216, communication circuitry 218, and one or more data storage devices 222. Of course, in other embodiments, the compute device 140 may include other or additional components, such as those commonly found in a computer (e.g., display, peripheral devices, etc.). Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation, such as data received from the field devices 130, 132, 134, 136, load prediction data, fault prediction data, applications, programs, libraries, and drivers.

The compute engine 210 is communicatively coupled to other components of the compute device 140 via the I/O subsystem 216, which may be embodied as circuitry and/or components to facilitate input/output operations with the compute engine 210 (e.g., with the processor 212 and/or the main memory 214) and other components of the compute device 140. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 140, into the compute engine 210.

The communication circuitry 218 may be embodied as any communication circuit, device, or collection thereof, capable of enabling communications between the compute device 140 and another device (e.g., the compute device 142, the client device 180, the edge devices 120, 122, the field devices 130, 132, 134, 136, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the compute device 140 to connect with another compute device. In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 140 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 224 may include a system partition that stores data and firmware code for the data storage device 224. Each data storage device 224 may also include an operating system partition that stores data files and executables for an operating system. Additionally or alternatively, the compute device 140 may include one or more peripheral devices. Such peripheral devices may include any type of peripheral device commonly found in a compute device such as a display or other output device and/or one more input devices, such as a touchscreen or buttons, forming a human-machine interface (HMI).

The compute device 142, the edge devices 120, 122, the field devices 130, 132, 134, 136, the client device 180, and the synchronization server 170 may have components similar to those described in FIG. 2. The description of those components of the compute device 140 is equally applicable to the description of components of the compute device 142, the edge devices 120, 122, the field devices 130, 132, 134, 136, the client device 180, and the synchronization server 170 and is not repeated herein for clarity of the description. Further, it should be appreciated that the compute device 142, the edge devices 120, 122, the field devices 130, 132, 134, 136, the client device 180, and the synchronization server 170 include other components, sub-components, and devices commonly found in a computing device or in a field device (e.g., sensors, electromechanical devices, etc.), which are not discussed above in reference to the compute device 140 and not discussed herein for clarity of the description.

In the illustrative embodiment, the compute devices 140, 142, the edge devices 120, 122, the field devices 130, 132, 134, 136, the client device 180, and the synchronization server 170 are illustratively in communication via the network 112, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
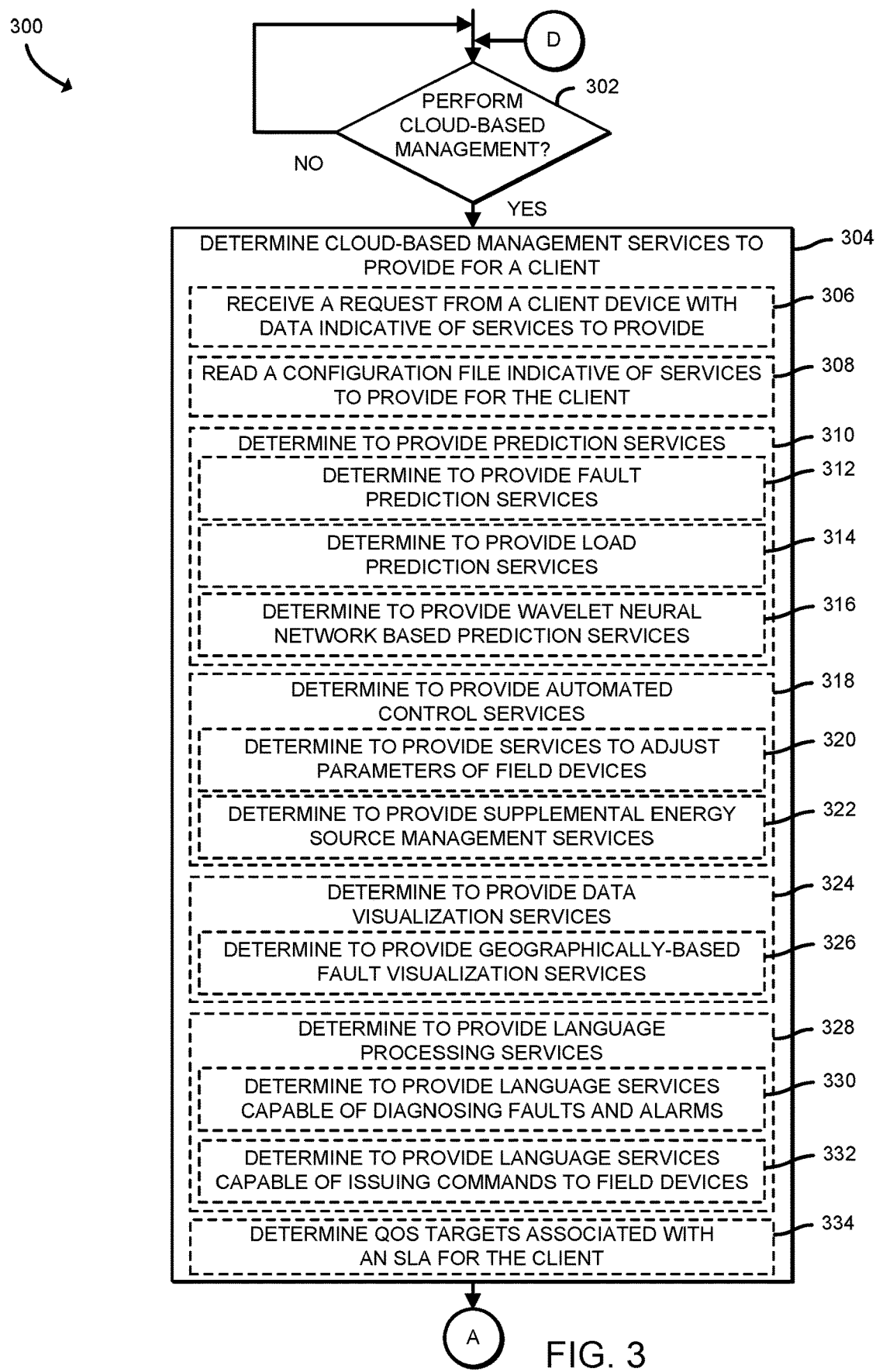
FIGS. 3-6 are a simplified flow diagram of at least one embodiment of a method for providing cloud-based management of an electrical grid that may be performed by the compute device of FIGS. 1 and 2.

Referring now to FIG. 3, the compute device 140, in operation, may perform a method 300 of providing cloud-based management of an electrical grid (e.g., the electrical grid 114). In the illustrative embodiment, the method 300 begins with block 302 in which the compute device 140 determines whether to perform cloud-based management of the electrical grid 114. In the illustrative embodiment, the compute device 140 may determine to perform cloud-based management of the electrical grid 114 if the compute device 140 is powered on and in communication the control center 110 (e.g., the client device 180) and/or one or more devices (e.g., edge devices 120, 122, field devices 130, 132, 134, 136, etc.) of the electrical grid 114. In other embodiments, the compute device 140 may make the determination based on other factors. Regardless, in response to a determination to provide cloud-based management, the method 300 advances to block 304, in which the compute device 140 determines one or more cloud-based management services to provide for a client (e.g., a utility operating the control center 110). In doing so, and as indicated in block 306, the compute device 140 may receive a request from a client device (e.g., the client device 180) that includes data indicative of the services to provide (e.g., identifiers of applications to be executed, executable code defining the applications, etc.). Alternatively, the compute device 140 may read a configuration file indicative of the services to provide for the client, as indicated in block 308. In other embodiments, the compute device 140 may determine, from another source, which services to provide. In determining the services to provide, the compute device 140 may determine to provide prediction services, as indicated in block 310. For example, and as indicated in block 312, the compute device 140 may determine to provide fault prediction services (e.g., to predict a time frame and type of fault that may occur in the electrical grid 114, such as a particular type of malfunction of one or more of the field devices 130, 132, 134, 136). Similarly, and as indicated in block 314, the compute device 140 may determine to provide load prediction services, such as by identifying patterns in the usage of electricity in the electrical grid 114 and predicting, as a function of the identified patterns and potentially other factors, such as predicted weather, loads on the electrical grid 114 at different future time periods. In the illustrative embodiment, the compute device 140 may determine to perform the prediction services using a wavelet neural network (e.g., a network that combines a sigmoid neural network and wavelet analysis), as indicated in block 316.

As indicated in block 318, the compute device 140 may additionally or alternatively determine to provide automated control services. In doing so, the compute device 140 may determine to provide services to adjust operational parameters of field devices (e.g., the field devices 130, 132, 134, 136, such as breaker settings, tap settings, etc.) such as in response to present conditions (e.g., a present load and/or a present fault) in the electrical grid 114 and/or predicted conditions (e.g., a predicted load or a predicted fault), as indicated in block 320. Additionally or alternatively, the compute device 140 may determine to provide supplemental energy source management services (e.g., to obtain power from one or more supplemental energy sources (not shown)

such as a solar power source or a set of wind turbines), as indicated in block 322. As indicated in block 324, the compute device 140 may determine to provide data visualization services. For example, and as indicated in block 326, the compute device 140 may determine to provide geographically-based fault visualization services (e.g., generating a visual representation of geographic area covered by the electrical grid 114 and visual markers indicative of areas of the grid 114 affected by one or more faults). The compute device 140 may additionally or alternatively determine to provide language processing services (e.g., processes to parse and analyze data such as speech or text provided in a human language to the compute device 140 and/or to output data from one format to a human language), as indicated in block 328. In doing so, the compute device 140 may determine to provide language services capable of diagnosing faults and/or alarms (e.g., to provide assistance to a user of the client device 180 to determine the cause of a fault or alarm and/or to suggest one or more corrective actions), as indicated in block 330. The compute device 140 may also determine to provide language services capable of issuing commands to one or more field devices 130, 132, 134, 136 (e.g., converting a request provided in a human language to the compute device 140 from the client device 180 to a command that the corresponding field device is configured to respond to), as indicated in block 332.

As indicated in block 334, in determining the services to provide for the client, the compute device 140 may also determine one or more quality of services parameters (e.g., a target latency, a target number of operations per second to be performed, a target bandwidth to be allocated to services performed on behalf of the client), which may be associated with a service level agreement (SLA) between the utility and the operator of the cloud data center 116. As such, the compute device 140 may allocate the corresponding resources of the compute engine 210, the I/O subsystem 216, the communication circuitry 218, and/or the data storage devices 222 to satisfy the corresponding quality of service parameters. Subsequently, the method 300 advances to block 336 of FIG. 4, in which the compute device 140 initializes the determined services (e.g., from block 304).

Figure 4:
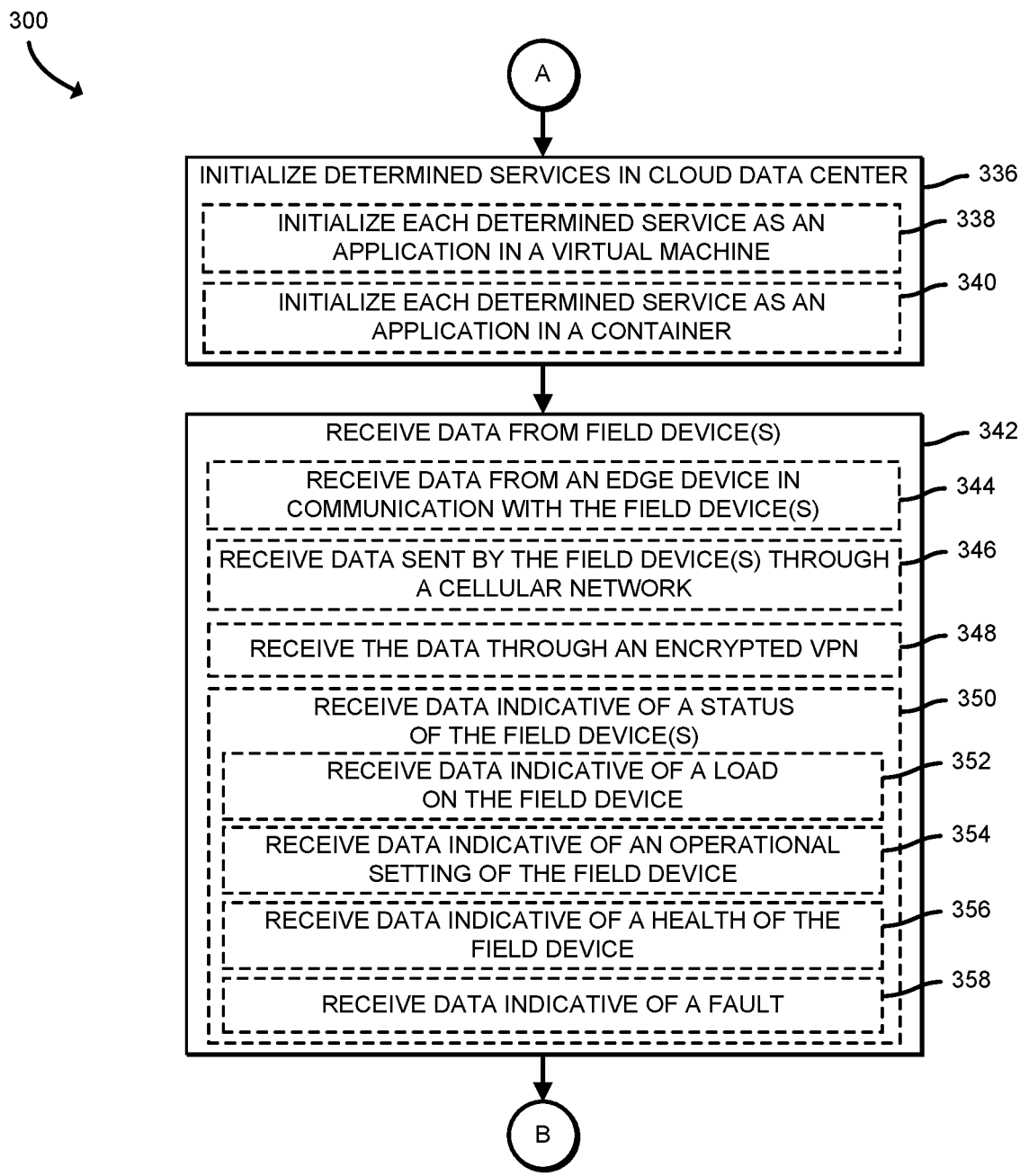

Referring now to FIG. 4, in initializing the determined services, the compute device 140 may initialize (e.g., execute) each determined service as an application in a virtual machine (e.g., the virtual machines 150, 152 and the corresponding applications 160, 162), as indicated in block 338. Alternatively, the compute device 140 may initialize one or more of the services as an application in a container (e.g., an executable package of a piece of software that includes everything needed to execute the software, such as code, a runtime, system tools, system libraries, settings, etc. thereby providing isolation from other applications executed by the compute device 140), as indicated in block 340. Subsequently, the method 300 advances to block 342, in which the compute device 140, in the illustrative embodiment, receives data from the field devices 130, 132, 134, 136. In doing so, and as indicated in block 344, the compute device 140 receives data from one or more edge devices (e.g., the edge devices 120, 122) in communication with the field devices 130, 132, 134, 136. As indicated in block 346, the compute device 140, in the illustrative embodiment, receives data sent by the field devices 130, 132, 134, 136 through a cellular network (e.g. an LTE network). Further, in the illustrative embodiment, the compute device 140 receives the data through an encrypted virtual private network (VPN) (e.g., to isolate communications associated with the electrical grid 114 of the utility operating the control center 110 from communications associated with other utilities that may be using one or more services of the cloud data center 116), as indicated in block 348.

As indicated in block 350, the compute device 140 may receive data indicative of the status of the field devices 130, 132, 134, 136. For example, and as indicated in block 352, the compute device 140 may receive data indicative of a load on one or more of the field devices 130, 132, 134, 136. Additionally or alternatively, the compute device 140 may receive data indicative of a an operational setting (e.g., a tap setting, a position of an electromechanical switch, etc.) of a field device 130, 132, 134, 136, as indicated in block 354. The compute device 140 may receive data indicative of a health (e.g., data indicative of a level of wear and/or an expected remaining lifetime) of one or more of the field devices 130, 132, 134, 136, as indicated in block 356. As indicated in block 358, the compute device 140 may additionally or alternatively receive data indicative of a fault in the electrical grid 114. In the illustrative embodiment, and as indicated in block 358, the compute device 140 additionally receives data indicative of the location of the fault (e.g., an identifier of the field device 130, 132, 134, 136 reporting the fault, which may be cross-referenced with data, such as in the memory 214, that associates identifiers of field devices with geographic locations, etc.). Subsequently, the method 300 advances to block 360 of FIG. 5, in which the compute device 140 analyzes the received data with the determined services (e.g., the application(s) initialized in block 336).

Figure 5:
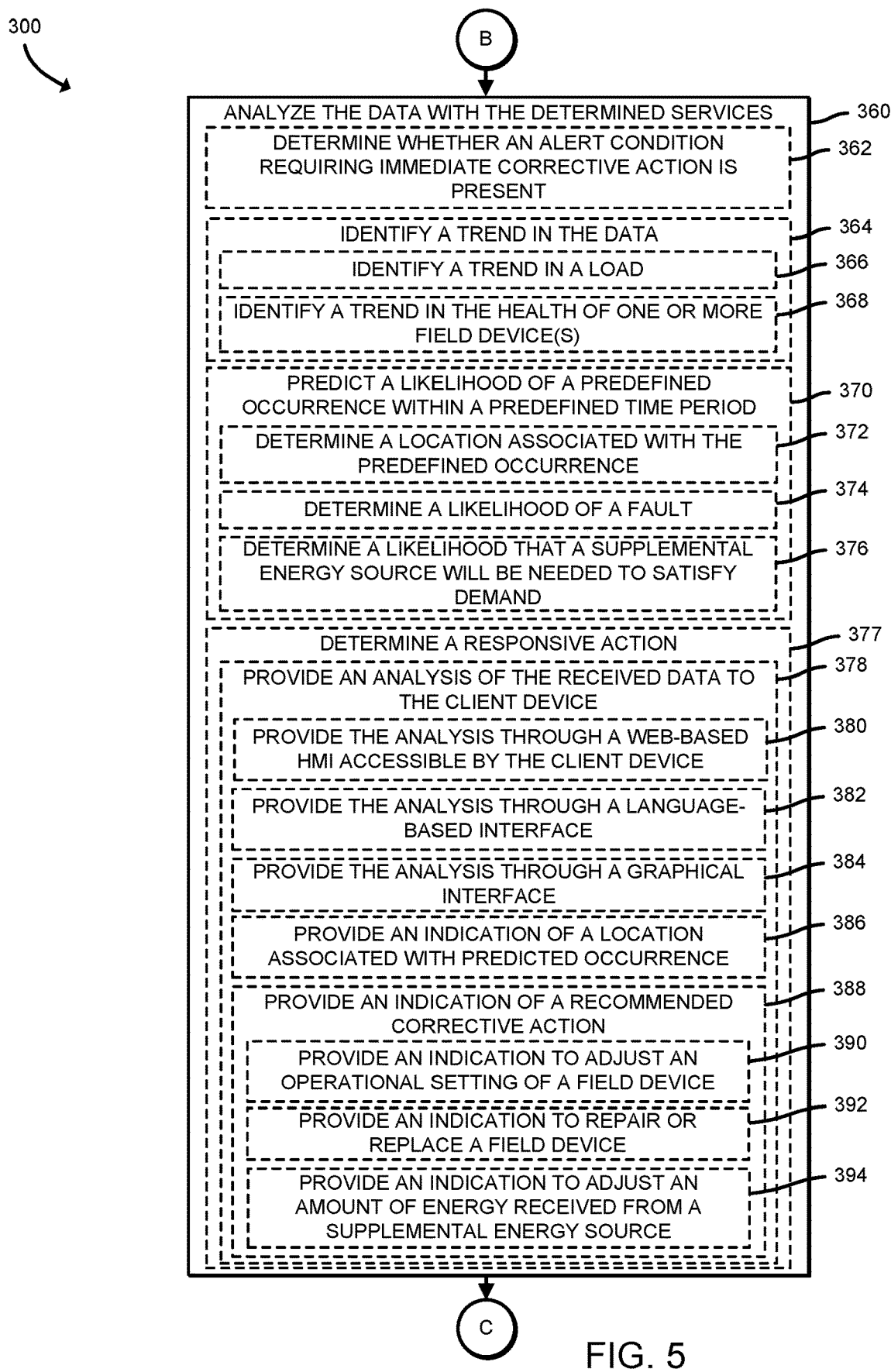

Referring now to FIG. 5, in analyzing the data with the determined services, the compute device 140 may determine whether an alert condition requiring immediate (e.g., within a predefined time period) corrective action is present, as indicated in block 362. As indicated in block 364, the compute device 140 may identify a trend in the received data. For example, and as indicated in block 366, the compute device 140 may identify a trend in the load on the electrical grid 114 over time. Additionally or alternatively, the compute device 140 may identify a trend in the health of one or more field devices 130, 132, 134, 136 (e.g., from block 356) which may be usable to determine a timeline for a failure of the corresponding field device 130, 132, 134, 136, as indicated in block 368. The compute device 140, may additionally determine a likelihood (e.g., a probability) of a predefined condition occurring within a predefined time period, as indicated in block 370. In doing so, and as indicated in block 372, the compute device 140 may determine a location (e.g., a geographic location, such as a location of a field device in the grid 114) associated with the predefined occurrence. As indicated in block 374, the compute device 140 may determine a likelihood of a fault occurring within a predefined time period (e.g., within a predefined number of days, within a predefined number of hours, etc.). Additionally or alternatively, the compute device 140 may determine a likelihood that a supplemental energy source (e.g., a solar energy source, a set of one or more wind turbines, etc.) will be needed to satisfy a predicted demand for electricity in the grid 114, as indicated in block 376. As indicated in block 377, the compute device 140 may determine a responsive action. For example, and as indicated in block 378, the compute device 140 may provide an analysis of the received data to the client device 180. In doing so, and as indicated in block 380, the compute device 140 may provide the analysis through a web-based (e.g., hyper-text transfer protocol (HTTP), etc.) human machine interface (HMI), such as a web-page, that is accessible by the client device 180 (e.g., through a web browser).

As indicated in block 382, the compute device 140 may provide the analysis through a language-based interface (e.g., a chat window, a text-to-speech interface, etc.). Additionally or alternative, the compute device 140 may provide the analysis through a graphical interface (e.g., an interface that provides a graphical representation of the electrical grid 114 and the status of the field devices 130, 132, 134, 136), as indicated in block 384. Additionally, the compute device 140 may provide an indication of a location associated with a predicted occurrence (e.g., an indication of a location of a predicted fault), as indicated in block 386. As indicated in block 388, the compute device 140 may provide an indication of a recommended corrective action. For example, and as indicated in block 390, the compute device 140 may provide a recommendation to adjust an operation setting of a field device 130, 132, 134, 136. Additionally or alternatively, the compute device 140 may provide a recommendation to repair or replace a field device 130, 132, 134, 136, as indicated in block 392. In some embodiments, compute device 140 may provide a recommendation to adjust an amount of energy received from a supplemental energy source (e.g., to satisfy a present or predicted demand for electricity), as indicated in block 394. Subsequently, the method 300 advances to block 396 of FIG. 6, in which the compute device 140 performs a responsive action.

Figure 6:
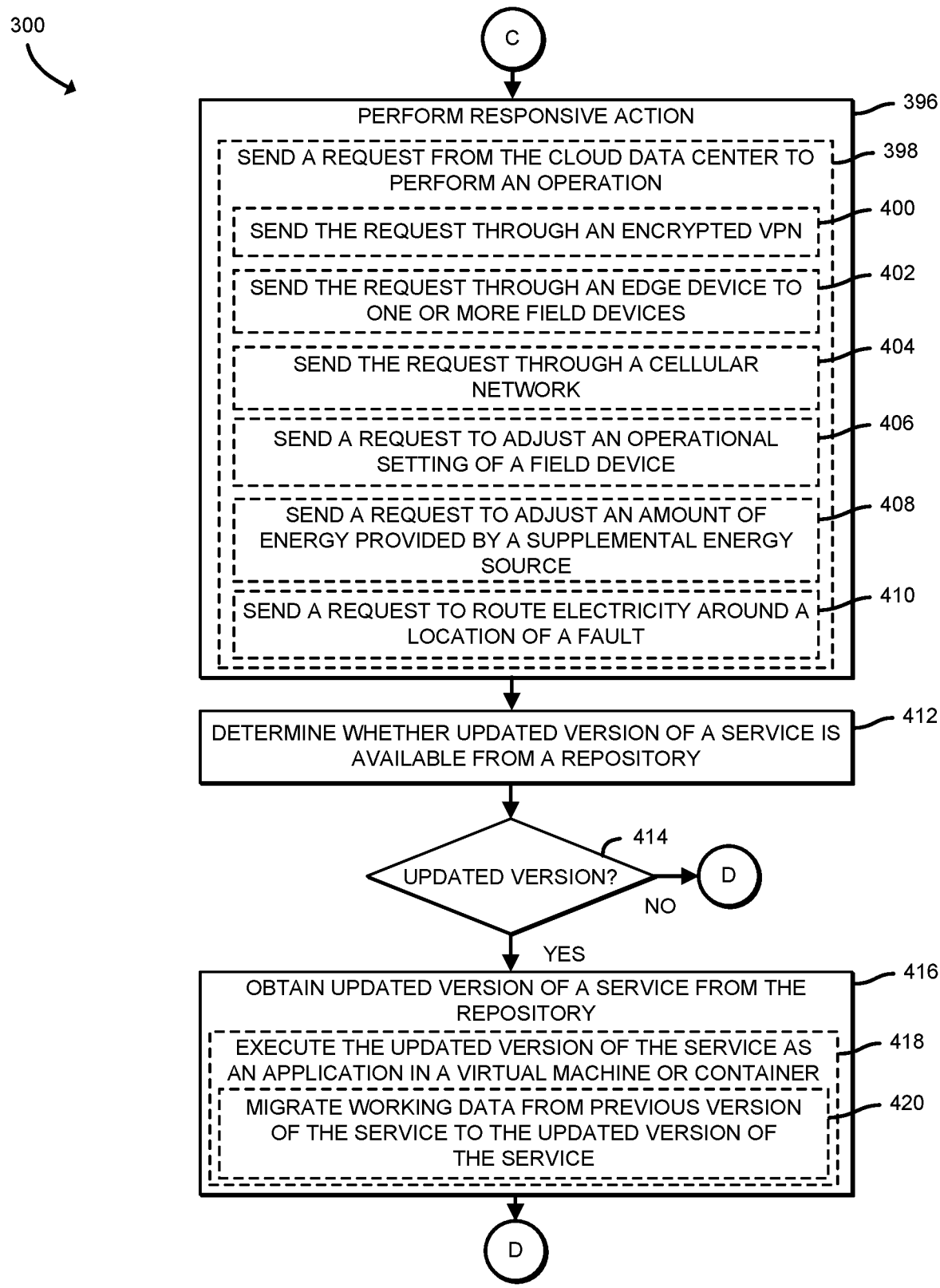

Referring now to FIG. 6, in performing the responsive action, the compute device 140, may send a request from the cloud data center 116 to perform the operation, as indicated in block 398. For example, and as indicated in block 400, the compute device 140 may send the request through an encrypted VPN. Additionally, in doing so, the compute device 140 may send the request through an edge device 120, 122 to one or more corresponding field devices 130, 132, 134, 136, as indicated in block 402. As indicated in block 404, the compute device 140 may send the request through a cellular network (e.g., between an edge device 120 and a corresponding field device 130). The compute device 140 may send a request to adjust an operational setting of a field device, as indicated in block 406. Additionally or alternatively, the compute device 140 may send a request to adjust an amount of energy provided by a supplemental energy source (e.g., to bring a solar power source or a set of wind turbines online or to increase or decrease an amount of electricity received therefrom), as indicated in block 408. In some embodiments, the compute device 140 may send a request (e.g., to one or more of the field devices 130, 132, 134, 136) to route electricity around a location of a fault that the compute device 140 has detected, as indicated in block 410. Subsequently, in block 412, the compute device 140, in the illustrative embodiment, determines whether an updated version of a service is available, such as from a repository (e.g., a database of applications that is hosted at the cloud data center 116 or at a remote location). In block 414, the compute device 140 determines the subsequent course of action as a function of whether an updated version of any service (e.g., application) is available. If not, the method 300 loops back to block 302 of FIG. 3 to determine whether to continue to provide cloud-based management of the electrical grid 114. Otherwise (e.g., if the compute device 140 determined that one or more updated services are available), the method 300 advances to block 416, in which the compute device 140 obtains an updated version of one or more services from the repository. In doing so, and as indicated in block 418, the compute device 140 executes the updated version of the service in virtual machine or a container and, as indicated in block 420, migrates the working data (e.g., data in a memory space of the memory 214 used by the previous version of the application) to the updated version of the service (e.g., application). Subsequently, the method 300 loops back to block 302 of FIG. 3 to determine whether to continue to provide cloud-based management of the electrical grid 114.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method for providing cloud-based management of an electrical grid, the method comprising:
   determining, by a compute device of a cloud data center, one or more cloud-based electrical grid management services to provide for a client of the cloud data center;
   executing, by the compute device, each determined service in a virtual machine hosted by the compute device;
   receiving, by the compute device, data from one or more field devices in the electrical grid through an encrypted virtual private network;
   analyzing, by the compute device and with the one or more determined services executed in the virtual machine, the received data to determine a responsive action; and
   sending, by the compute device, a request through the encrypted virtual private network to perform an operation.

2. The method of claim 1, wherein the client is a first client and the method further comprises concurrently executing, by the compute device and in a second virtual machine hosted by the compute device, one or more cloud-based electrical grid management services for a second client.

3. The method of claim 1, further comprising:
   obtaining, by the compute device, an updated version of one of the services from a repository;
   executing, by the compute device, the updated version of the service in a virtual machine; and
   migrating, by the compute device, working data from a previous version of the service to the updated version of the service.

4. The method of claim 1, wherein receiving data from one or more field devices comprises receiving data sent by the one or more field devices through a cellular network.

5. The method of claim 4, wherein receiving data from one or more field devices comprises receiving data sent by the one or more field devices to an edge device in communication with the one or more field devices.

6. The method of claim 1, wherein sending the request to perform an operation comprises sending a request to adjust an operational setting of a field device.

7. The method of claim 1, wherein sending the request to perform an operation comprises sending a request to route electricity around a location of a fault.

8. The method of claim 1, wherein determining the cloud-based electrical grid management services comprises determining to provide one or more prediction services, one or more automated control services, one or more data visualization services, or one or more language processing services.

9. The method of claim 8, wherein determining to provide one or more prediction services comprises determining to provide one or more services to predict a change in a load of the electrical grid or a fault in the electrical grid using a wavelet neural network.

10. The method of claim 8, wherein determining to provide one or more automated control services comprises determining to provide one or more services to adjust a parameter of a field device or to adjust an amount of energy provided to the electrical grid from one or more energy sources.

11. The method of claim 8, wherein determining to provide one or more data visualization services comprises determining to provide a service to generate a visual representation of a location of a fault in the electrical grid.

12. The method of claim 8, wherein determining to provide one or more language processing services comprises determining to provide a service to convert a natural language command from the client to a format usable by one of the field devices.

13. The method of claim 8, wherein determining to provide one or more language processing services comprises determining to provide a service to parse a request submitted from a client device in a natural language and provide, in response to the request, diagnostic data associated with a fault.

14. The method of claim 1, further comprising providing, by the compute device, the analysis of the received data to a client device through a web-based human machine interface.

15. The method of claim 1, wherein determining the cloud-based electrical grid management services comprises receiving a request from a client device, wherein the request includes data indicative of services to provide.

16. The method of claim 1, wherein receiving data from one or more field devices comprises receiving data indicative of a status of the one or more field devices including one or more of data indicative of a load on the field device, data indicative of an operational setting of the field device, data indicative of a health of the field device, or data indicative of a fault.

17. A compute device of a cloud data center to provide cloud-based management of an electrical grid, the compute device comprising:
a compute engine to:
determine one or more cloud-based electrical grid management services to provide for a client of the cloud data center;
execute each determined service in a virtual machine hosted by the compute device;
receive data from one or more field devices in the electrical grid through an encrypted virtual private network;
analyze, with the one or more determined services executed in the virtual machine, the received data to determine a responsive action; and
send a request through the encrypted virtual private network to perform an operation.

18. One or more machine-readable storage media comprising a plurality of instructions stored thereon that, in response to being executed, cause a compute device to:
determine one or more cloud-based electrical grid management services to provide for a client of the cloud data center;
execute each determined service in a virtual machine hosted by the compute device;
receive data from one or more field devices in the electrical grid through an encrypted virtual private network;
analyze, with the one or more determined services executed in the virtual machine, the received data to determine a responsive action:
send a request through the encrypted virtual private network to perform an operation.

19. The one or more machine-readable storage media of claim 18, wherein the client is a first client and the instructions further cause the compute device to concurrently execute, in a second virtual machine hosted by the compute device, one or more cloud-based electrical grid management services for a second client.

20. The one or more machine-readable storage media of claim 18, wherein the instructions further cause the compute device to:
obtain an updated version of one of the services from a repository;
execute the updated version of the service in a virtual machine; and
migrate working data from a previous version of the service to the updated version of the service.

21. The one or more machine-readable storage media of claim 18, wherein to receive data from one or more field devices comprises to receive data sent by the one or more field devices through a cellular network.

22. The one or more machine-readable storage media of claim 21, wherein to receive data from one or more field devices comprises to receive data sent by the one or more field devices to an edge device in communication with the one or more field devices.

23. The one or more machine-readable storage media of claim 18, wherein to send the request to perform an operation comprises to send a request to adjust an operational setting of a field device.

24. The one or more machine-readable storage media of claim 18, wherein to send the request to perform an operation comprises to send a request to route electricity around a location of a fault.

25. The one or more machine-readable storage media of claim 18, wherein to determine the cloud-based electrical grid management services comprises to determine to provide one or more prediction services, one or more automated control services, one or more data visualization services, or one or more language processing services.

26. The one or more machine-readable storage media of claim 25, wherein to determine to provide one or more prediction services comprises to determine to provide one or more services to predict a change in a load of the electrical grid or a fault in the electrical grid using a wavelet neural network.

27. The one or more machine-readable storage media of claim 25, wherein to determine to provide one or more automated control services comprises to determine to provide one or more services to adjust a parameter of a field device or to adjust an amount of energy provided to the electrical grid from one or more energy sources.

28. The one or more machine-readable storage media of claim 25, wherein to determine to provide one or more data visualization services comprises to determine to provide a service to generate a visual representation of a location of a fault in the electrical grid.

29. The one or more machine-readable storage media of claim 25, wherein to determine to provide one or more language processing services comprises to determine to provide a service to convert a natural language command from the client to a format usable by one of the field devices.

30. The one or more machine-readable storage media of claim 25, wherein to determine to provide one or more language processing services comprises to determine to provide a service to parse a request submitted from a client device in a natural language and provide, in response to the request, diagnostic data associated with a fault.

31. The one or more machine-readable storage media of claim 18, wherein the instructions further cause the compute device to provide the analysis of the received data to a client device through a web-based human machine interface.

32. The one or more machine-readable storage media of claim 18, wherein to determine the cloud-based electrical grid management services comprises to receive a request from a client device, wherein the request includes data indicative of services to provide.

33. The one or more machine-readable storage media of claim 18, wherein to receive data from one or more field devices comprises to receive data indicative of a status of the one or more field devices including one or more of data indicative of a load on the field device, data indicative of an operational setting of the field device, data indicative of a health of the field device, or data indicative of a fault.

* * * * *